(12) United States Patent
Morscheck

(10) Patent No.: US 6,636,795 B1
(45) Date of Patent: Oct. 21, 2003

(54) POWERTRAIN TORQUE CONTROL

(75) Inventor: Timothy J. Morscheck, Kalamazoo, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/314,515

(22) Filed: May 17, 1999

(51) Int. Cl.$^7$ .............. G06F 17/00; B60T 7/12; G05D 1/00; B60K 41/04
(52) U.S. Cl. .............. 701/54; 701/51; 701/56; 701/61; 701/84; 701/87; 701/90; 477/107; 477/110
(58) Field of Search .............. 701/51, 54, 55, 701/56, 57, 58, 59, 60, 61, 88, 87, 90; 477/107, 110, 111; 74/860

(56) References Cited

U.S. PATENT DOCUMENTS

| | | | |
|---|---|---|---|
| 4,361,060 A | 11/1982 | Smyth | 364/424.1 |
| 4,889,014 A | 12/1989 | Iwata | 74/858 |
| 5,305,213 A * | 4/1994 | Boardman et al. | 701/54 |
| 5,435,212 A | 7/1995 | Menig | 74/745 |
| 5,457,633 A | 10/1995 | Palmer | 364/431.09 |
| 5,477,827 A | 12/1995 | Weisman | 123/436 |
| 5,509,867 A | 4/1996 | Genise | 477/120 |
| 5,679,096 A * | 10/1997 | Stine et al. | 477/111 |
| 5,738,606 A | 4/1998 | Bellinger | 477/111 |
| 5,797,110 A * | 8/1998 | Braun et al. | 701/84 |
| 5,876,302 A * | 3/1999 | Palmeri | 477/111 |
| 6,080,082 A * | 6/2000 | Steeby | 477/111 |

FOREIGN PATENT DOCUMENTS

| | | |
|---|---|---|
| DE | 19725816 | 2/1998 |
| EP | 0524667 | 1/1993 |
| EP | 0774374 | 5/1997 |
| WO | WO97/10965 | 9/1996 |

* cited by examiner

Primary Examiner—William A. Cuchlinski, Jr.
Assistant Examiner—Brian J. Broadhead
(74) Attorney, Agent, or Firm—Kevin M. Hinman; Howard D. Gordon

(57) ABSTRACT

A powertrain system (10) control for controlling engine (12) output torque as a function of engaged ratio of a transmission (14). Separate torque limits, A, B, C, D, respectively, are set for start ratios, intermediate ratios, direct ratio and overdrive ratios. The torque limits are set such that A<B<C>D and B<D.

7 Claims, 4 Drawing Sheets

| FORWARD SPEED | RATIO (:1.00) | ALLOWABLE INPUT TORQUE (LBS. FT.) | RATIO TYPE |
|---|---|---|---|
| 1ST | 9.24 | 1250-1350 | START |
| 2ND | 5.35 | 1450-1650 | INTERMEDIATE |
| 3RD | 3.22 | 1450-1650 | INTERMEDIATE |
| 4TH | 2.04 | 1450-1650 | INTERMEDIATE |
| 5TH | 1.37 | 1450-1650 | INTERMEDIATE |
| 6TH | 1.00 | 1850 | DIRECT |
| 7TH | 0.75 | 1750 | OVERDRIVE |

*FIG. 2A*

| FORWARD SPEED | RATIO (:1.00) | ALLOWABLE INPUT TORQUE ((LBS. FT.) | RATIO TYPE |
|---|---|---|---|
| 1ST | 14.40 | 1250-1350 | START |
| 2ND | 12.29 | 1250-1350 | START |
| 3RD | 8.56 | 1250-1350 | START |
| 4TH | 7.30 | 1250-1350 | START |
| 5TH | 6.05 | 1250-1350 | START |
| 6TH | 5.16 | 1250-1350 | START |
| 7TH | 4.38 | 1450-1650 | INTERMEDIATE |
| 8TH | 3.74 | 1450-1650 | INTERMEDIATE |
| 9TH | 3.20 | 1450-1650 | INTERMEDIATE |
| 10TH | 2.73 | 1450-1650 | INTERMEDIATE |
| 11TH | 2.29 | 1450-1650 | INTERMEDIATE |
| 12TH | 1.95 | 1450-1650 | INTERMEDIATE |
| 13TH | 1.62 | 1450-1650 | INTERMEDIATE |
| 14TH | 1.38 | 1450-1650 | INTERMEDIATE |
| 15TH | 1.17 | 1450-1650 | INTERMEDIATE |
| 16TH | 1.00 | 1850 | DIRECT |
| 17TH | 0.86 | 1750 | OVERDRIVE |
| 18TH | 0.73 | 1750 | OVERDRIVE |

*FIG. 2B*

POWERTRAIN TORQUE CONTROL

BACKGROUND OF THE INVENTION

1. Field of the Invention

The present invention relates to a control for a vehicular powertrain comprising a fuel-controlled engine and a multiple-ratio drivetrain, including a multiple-speed transmission and a single- or mulitple-speed drive axle assembly. In particular, the present invention relates to a powertrain control wherein the maximum output torque of the engine is limited as a function of engaged drivetrain ratio.

2. Description of the Prior Art

Vehicular drivetrains including multiple-speed transmissions, usually compound transmissions, or simple transmissions coupled with multiple-speed axles, having 7, 9, 10, 13, 16, 18 or more forward speed ratios, are well known in the prior art, especially for heavy-duty vehicles, as may be seen by reference to U.S. Pat. Nos. 5,370,013; 5,527,237 and 4,754,665, the disclosures of which are incorporated herein by reference.

Control systems and methods for calculating engine output torque (also called "flywheel torque") are known in the prior art, as may be seen by reference to U.S. Pat. No. 5,509,867, the disclosure of which is incorporated herein by reference.

Automated and manual transmission systems wherein engine output torque is controlled and/or limited as a function of engaged gear ratio and/or vehicle speed are known in the prior art, as may be seen by reference to U.S. Pat. Nos. 5,477,827; 5,797,110; 5,457,633; 4,889,014; 5,738,606; 5,679,096 and 5,876,302, the disclosures of which are incorporated herein by reference. As is known, modern vehicular powertrains usually include electronically controlled engines, which may be controlled as to engine speed and/or engine torque. By way of example, according to the SAE J-1939 data link protocol, commands may be issued to the engine for fueling of the engine in accordance with (a) driver's fuel demand, (b) a requested engine speed, (c) a requested engine torque and/or (d) a requested maximum engine torque and/or engine speed.

SUMMARY OF THE INVENTION

In accordance with the present invention, an improved control system/method for a vehicular powertrain is provided, which will tend to maximize vehicle performance while protecting the drivetrain from possible damage and/or undue wear caused by allowing excessive torque to be applied thereto under certain vehicle operating conditions. The foregoing is accomplished by limiting engine output torque to a first maximum value when the drivetrain is in a start ratio condition, by limiting engine output torque to a second maximum value when the drivetrain is in an intermediate ratio (the second maximum value being greater than the first maximum value), allowing engine torque to equal a third maximum value greater than the second maximum value when the transmission is in a direct drive or 1:1 ratio, and allowing engine torque to equal a fourth maximum value when the transmission is in an overdrive ratio condition (the fourth maximum value being less than the third maximum value but greater than the second maximum value).

Accordingly, it is an object of the present invention to provide a new and improved engine output torque control for a vehicular drivetrain system, preferably a vehicular powertrain system including a transmission having a direct drive ratio.

This and other objects and advantages of the present invention will become apparent from a reading of the description of the preferred embodiment taken in connection with the attached drawings.

BRIEF DESCRIPTION OF THE DRAWINGS

FIGS. 2A and 2B are charts illustrating the drive ratios and allowable drivetrain input torques for a typical heavy-duty vehicle powertrain system including a drivetrain having, respectively, a 7-speed and an 18-speed overdrive transmission.

DESCRIPTION OF THE PREFERRED EMBODIMENT

Figure 1:
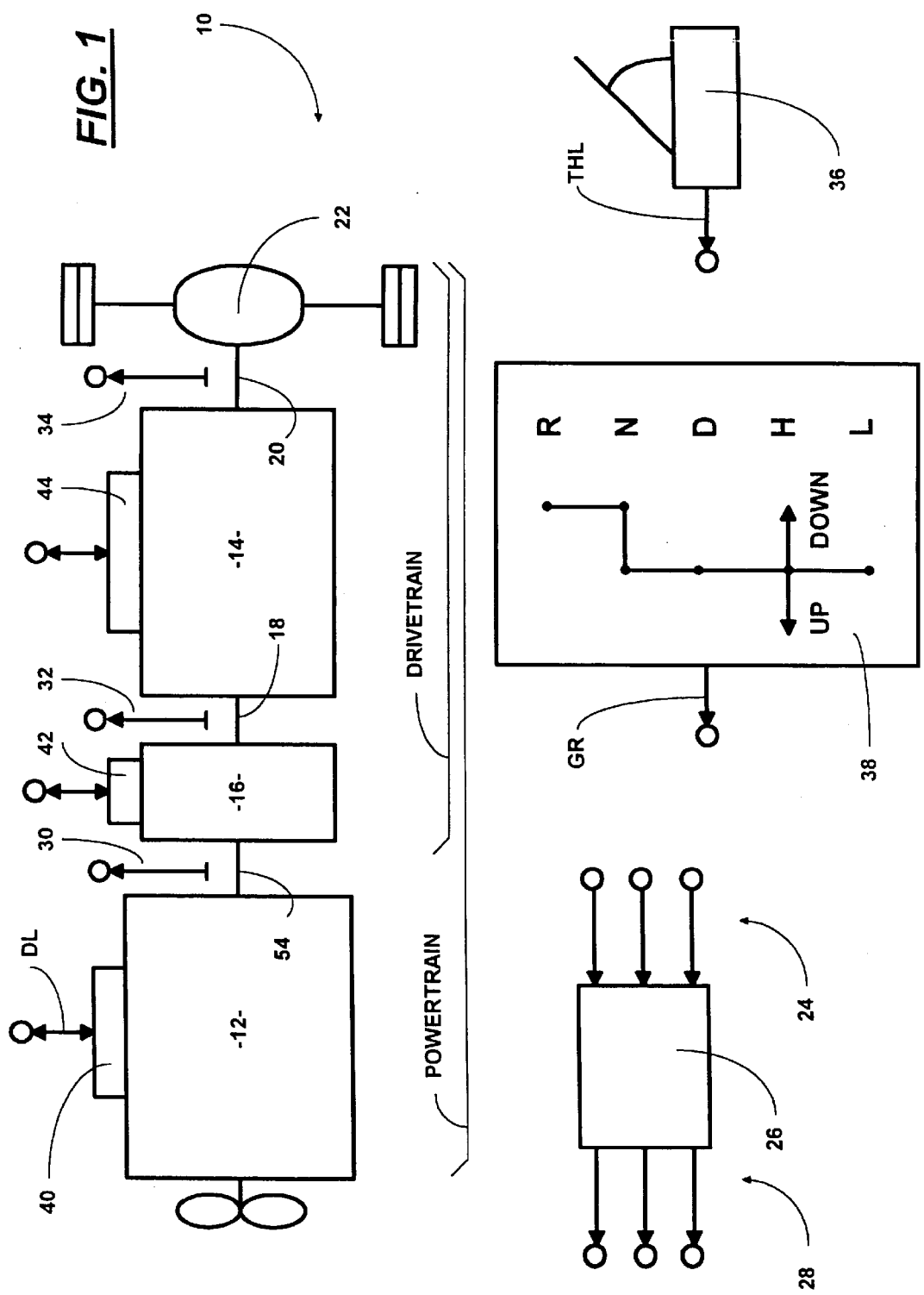
FIG. 1 is a schematic illustration of a vehicular powertrain system including an automated mechanical transmission system.

A vehicular powertrain system 10 of the type advantageously utilizing the control of the present invention may be seen by reference to FIG. 1. For purposes of illustration, system 10 is an automated mechanical transmission system including a fuel-controlled internal combustion engine 12 (such as a well-known diesel engine or the like), a multiple-speed mechanical transmission 14, and a non-positive coupling 16 for drivingly coupling the engine 12 to the transmission 14. Typically, non-positive coupling 16 will be a torque converter or a friction master clutch. The transmission 14 further includes an output shaft 20 for driving the vehicle drive axles 22. The drive axles may be of the single-speed or mulitple-speed type.

Transmission 14 may be of the known mechanical type utilizing positive jaw clutches to engage and disengage selected gears to shafts for changing the ratio of input shaft rotational speed (IS) to output shaft rotational speed (OS). Transmissions of this type may be seen by reference to U.S. Pat. Nos. 4,764,665; 5,385,056; 5,390,561 and 5,416,698.

System 10 may include a plurality of sensors for providing input signals 24 to a microprocessor-based control unit 26, which will process the input signals according to logic rules to generate command output signals 28 to various system actuators.

Speed sensors 30, 32 and 34 may be provided to provide input signals to the controller indicative of engine speed (ES), transmission input shaft speed (IS), and transmission output shaft speed (OS), respectively. A sensor 36 may be provided to provide an input signal indicative of the operator setting of the throttle pedal. A driver control console 38 is provided to allow the operator to select a transmission mode and to provide an input signal, GR, indicative thereof to the controller 26.

An engine controller 40, preferably microprocessor-based, may be provided for controlling fueling of the engine and for providing information to a data link, DL, indicative of the operating parameters of the engine. Preferably, the data link will comply with a known protocol, such as SAE J-1939 or the like. An actuator 42 may be provided for operating the non-positive coupling 16. A transmission actuator 44 may be provided for operating the transmission 14 and for providing signals indicative of the engaged gear ratio and/or other transmission operating parameters. Engaged ratio also may be calculated by comparing the rotational speeds of the input and output shafts.

As used in this application, and as commonly used in the vehicular industry, the term "powertrain" will refer to the engine 12, coupling 16, transmission 14 and drive axles 12, while the term "drivetrain" will refer to the coupling 16, the transmission 14 and the axles 22.

Transmission 14 is illustrated as an 18-forward-speed transmission having a direct drive (1:1.00) ratio and two overdrive ratios (see FIG. 2B). As is well known, in the direct drive ratio, the shafts are directly coupled and torque is not applied to the gears; accordingly, a much higher torque may be applied to the transmission in direct drive without damaging or causing excessive wear to the gears. It also is known that the higher rotational speeds associated with overdrive (i.e., ratios wherein output shaft rotational speed exceeds input shaft rotational speed) allows a higher input torque to be applied to the transmission than in greater than 1:1.00 reduction ratios without risking damage and/or undue wear.

According to the present invention, engine torque is limited to one of four maximum values according to the sensed or expected engaged ratio. FIG. 2A illustrates the application of the present invention to a 7-speed overdrive transmission.

In the start ratios, usually 1st through 6th in an 18-speed transmission, engine output torque is limited to a first maximum value (A). In the intermediate ratios, usually 7th through 15th in an 18-speed transmission, engine output torque is limited to a second maximum value (B). In direct, engine output torque is limited to a third maximum value (C). Value C may equal the maximum output of the engine. In overdrive ratios, 17th and 18th in the illustrated transmission, engine torque is limited to a fourth maximum value (D).

The maximum torque values are related as follows:

A<B<C>D and

B<D

Typical values of the maximum torque references are seen in FIGS. 2A and 2B, which are provided by way of example. In FIG. 2B, values for an RTLO 18918B transmission (available from Eaton Corporation, assignee of this application) and a typical heavy-duty vehicle diesel engine are provided.

Figure 3:
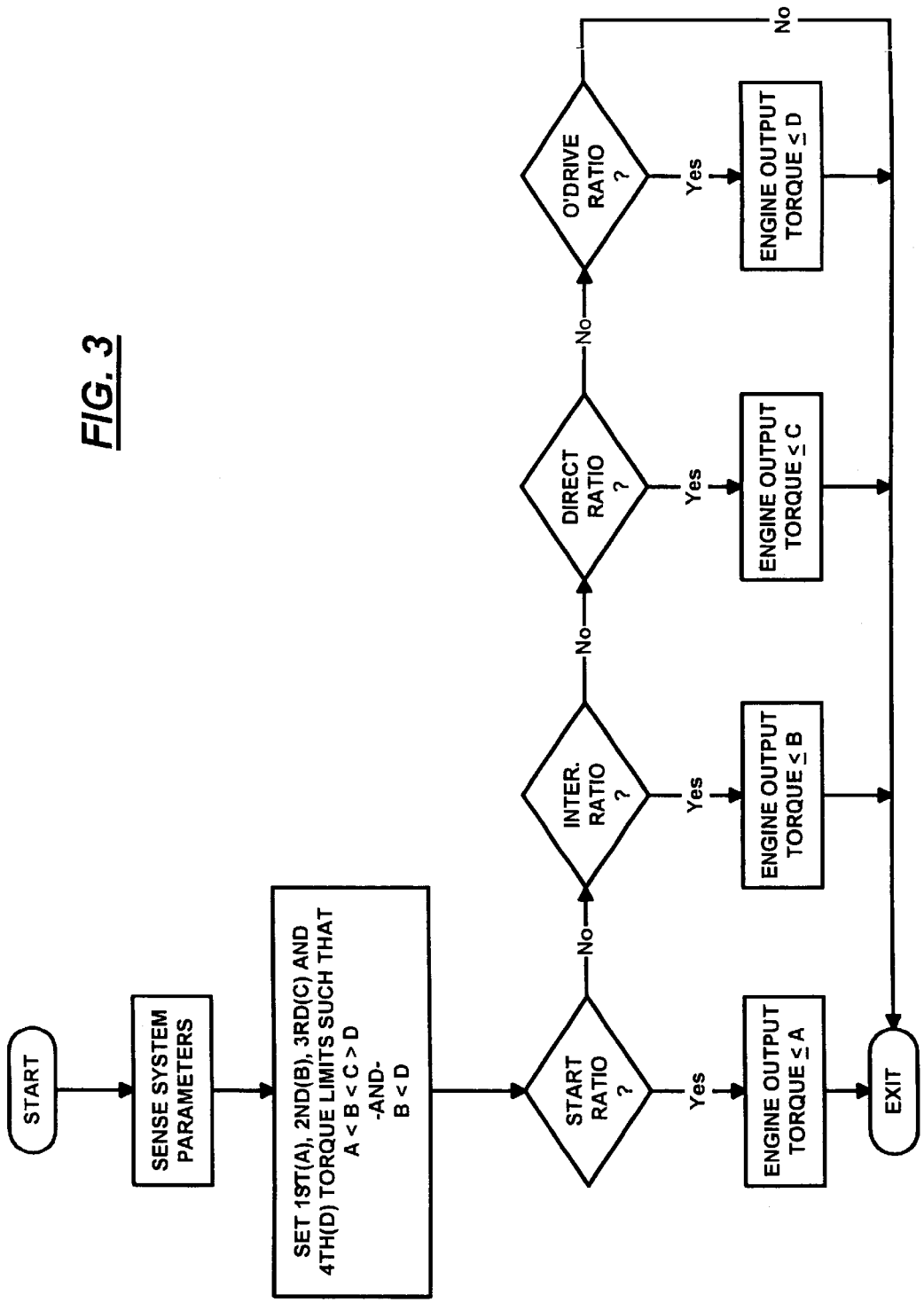
FIG. 3 is a flow chart representation of the control of the present invention.

FIG. 3 is a flow chart representation of the control of the present invention.

Torque values A, B, C and/or D may be ranges of values and/or may be subdivided.

Although the present invention has been described with a certain degree of particularity, it is understood that various modifications are possible without departing from the spirit and scope of the invention as hereinafter claimed.

I claim:

1. A method for controlling a vehicular powertrain system (10) comprising a fuel-controlled engine (12), an engine controller for controlling fueling of the engine (40), a multiple-speed transmission (14) having one or more start ratios, one or more intermediate ratios, a direct drive ratio, and one or more overdrive ratios, means (44) for sensing an engaged transmission ratio, and a controller (26) for receiving input signals (24) and processing same according to logic rules to issue command output signals to system actuators including said engine controller, said method comprising the steps of:

(i) sensing engaged transmission ratio;

(ii) setting first (A), second (B), third (C) and fourth (D) torque limit values such that:

A<B<C>D and

B<D (iii)(a) if the transmission is engaged in a start ratio, limiting engine output torque to said first torque limit ($T_E \leq A$), (b) if the transmission is engaged in an intermediate ratio, limiting engine output torque to said second torque limit ($T_E \leq B$), (c) if the transmission is engaged in the direct ratio, limiting engine output torque to said third torque limit ($T_E \leq C$), and (d) if the transmission is engaged in an overdrive ratio, limiting engine output torque to said fourth torque limit ($T_E \leq D$).

2. The method of claim 1 wherein said engine has a known maximum torque capacity, said third torque limit (C) equal to or exceeding said maximum torque capacity.

3. A method for controlling a vehicular powertrain system (10) comprising a fuel-controlled engine (12), an engine controller for controlling fueling of the engine (40), a multiple-speed transmission (14) having one or more intermediate ratios, a direct drive ratio, and one or more overdrive ratios, means (44) for sensing an engaged transmission ratio, and a controller (26) for receiving input signals (24) and processing same according to logic rules to issue command output signals to system actuators including said engine controller, said method comprising the steps of:

(i) sensing engaged transmission ratio;

(ii) setting second (B), third (C) and fourth (D) torque limit values such that:

B<C>D and

B<D (iii)(a) if the transmission is engaged in an intermediate ratio, limiting engine output torque to said second torque limit ($T_E \leq B$), (b) if the transmission is engaged in the direct ratio, limiting engine output torque to said third torque limit ($T_E \leq C$), and (c) if the transmission is engaged in an overdrive ratio, limiting engine output torque to said fourth torque limit ($T_E \leq D$).

4. The method of claim 3 wherein said engine has a known maximum torque capacity, said third torque limit (C) equal to or exceeding said maximum torque capacity.

5. A control system for controlling a vehicular powertrain system (10) comprising a fuel-controlled engine (12), an engine controller for controlling fueling of the engine (40), a multiple-speed transmission (14) having one or more start ratios, one or more intermediate ratios, a direct drive ratio, and one or more overdrive ratios, means (44) for sensing an engaged transmission ratio, and a controller (26) for receiving input signals (24) and processing same according to logic rules to issue command output signals to system actuators including said engine controller, said logic rules including rules for:

(i) sensing engaged transmission ratio;

(ii) setting first (A), second (B), third (C) and fourth (D) torque limit values such that:

A<B<C>D and

B<D (iii)(a) if the transmission is engaged in a start ratio, limiting engine output torque to said first torque limit ($T_E \leq A$), (b) if the transmission is engaged in an intermediate ratio, limiting engine output torque to said second torque limit ($T_E \leq B$), (c) if the transmission is engaged in the direct ratio, limiting engine output torque to said third torque limit ($T_E \leq C$), and (d) if the transmission is engaged in an overdrive ratio, limiting engine output torque to said fourth torque limit ($T_E \leq D$).

6. The system of claim 5 wherein said engine has a known maximum torque capacity, said third torque limit (C) equal to or exceeding said maximum torque capacity.

7. A control system for controlling a vehicular powertrain system (10) comprising a fuel-controlled engine (12), an engine controller for controlling fueling of the engine (40), a multiple-speed transmission (14) having one or more intermediate ratios, a direct drive ratio, and one or more overdrive ratios, means (44) for sensing an engaged transmission ratio, and a controller (26) for receiving input signals (24) and processing same according to logic rules to issue command output signals to system actuators including said engine controller, said logic rules including rules for:

(i) sensing engaged transmission ratio;

(ii) setting second (B), third (C) and fourth (D) torque limit values such that:

B<C>D and

B<D (iii)(a) if the transmission is engaged in an intermediate ratio, limiting engine output torque to said second torque limit ($T_E \leq B$), (b) if the transmission is engaged in the direct ratio, limiting engine output torque to said third torque limit ($T_E \leq C$), and (c) if the transmission is engaged in an overdrive ratio, limiting output torque to said fourth torque limit ($T_E \leq D$).

* * * * *